United States Patent [19]

Hiraoka

[11] Patent Number: 5,488,547
[45] Date of Patent: Jan. 30, 1996

[54] HEADLAMP FOR A MOTOR VEHICLE

[75] Inventor: Tatushi Hiraoka, Shizuoka, Japan

[73] Assignee: Koito Manufacturing Co., Ltd., Tokyo, Japan

[21] Appl. No.: 252,194

[22] Filed: Jun. 1, 1994

[30] Foreign Application Priority Data

Jun. 2, 1993 [JP] Japan .................. 5-131761

[51] Int. Cl.⁶ .................................. B60Q 1/04
[52] U.S. Cl. ............................ 362/66; 362/61
[58] Field of Search ................. 362/61, 66, 285, 362/373, 294

[56] References Cited

U.S. PATENT DOCUMENTS

| | | | |
|---|---|---|---|
| 5,050,048 | 9/1991 | Hendrischk et al. | 362/61 |
| 5,055,980 | 10/1991 | Mochizuki | 362/66 |
| 5,083,244 | 1/1992 | Shirai et al. | 362/61 |
| 5,140,503 | 8/1992 | Lisak | 362/61 |
| 5,317,486 | 5/1994 | Schmitt | 362/66 |

*Primary Examiner*—Ira S. Lazarus
*Assistant Examiner*—Sara Sachie Raab
*Attorney, Agent, or Firm*—Sughrue, Mion, Zinn, Macpeak & Seas

[57] ABSTRACT

A headlamp for a motor vehicle with a linear bubble tube type level vial 60 for detecting a vertical inclination of a vial 60 in which the reflector 14 is supported so as to be tiltable with respect to a lamp body 10 within a lamp chamber S defined by the lamp body 10 and a front lens 12, and the vial 60 contains a linear bubble tube 64 substantially horizontally and longitudinally disposed, characterized in that the level vial 60 is extended rearward from the rear wall of the reflector 14, whereby the level vial 60 is located apart from a heat source (bulb 16), thereby impeding the transfer of the heat to the linear bubble tube 64 of the level vial 60. A rear expanded portion 11 enclosing the level vial 60 is additionally formed to the lamp body 10, without increasing the size of the whole lamp body 10 in connection with the level vial 60. With this unique structure, the increase of the size of the lamp body 10 is not so much. Further, an air hole 76 allowing air to flow to and from the lamp chamber is formed in the rear expanded portion 11. With provision of the air hole, a negligible amount of heat stays around the level vial 60 within the rear expanded portion 11.

11 Claims, 4 Drawing Sheets

5,488,547

HEADLAMP FOR A MOTOR VEHICLE

BACKGROUND OF THE INVENTION

1. Field of the Invention

The present invention relates to a headlamp for a motor vehicle of the type in which a reflector within a lamp body is provided with a bubble tube type level vial for detecting a vertical inclination of the reflector.

2. Related Art

A conventional headlamp of this type is disclosed, for example, in Unexamined Japanese Patent Publication (OPI) No. Hei. 4-198830 as illustrated in FIG. 5. As shown, the headlamp includes a lamp body 1 and a front lens 2 for defining a lamp chamber S with the lamp body 1. The lamp chamber S accommodates therein a reflector 3 mounting thereon a bulb 4 acting as a light source is supported by an aiming mechanism 5 so that the reflector is tiltable with respect to the lamp body 1. A bubble tube type level vial 6 is disposed on the reflector 3. A degree of vertical inclination of the reflector 3 (an angle of vertical inclination of a light axis L of the headlamp) is detected by the level vial 6. That is, the level vial 6 indicates the angle of vertical inclination of the reflector 3. Reference numeral 7 designates an inclination detector 7 for detecting an angle of horizontal inclination (an angle of horizontal inclination of the light axis L of the headlamp) of the reflector 3, which is disposed between the aiming screws composed of the aiming mechanism 5 and the rear wall of the lamp body 1.

In the conventional headlamp thus structured, the level vial 6 is disposed on the upper wall of the reflector 3. Because of this structure, heat generated by the bulb 4 is easily transferred to the bubble tube of the level vial 6 through the reflector 3. For this reason, a bubble housed within the bubble tube may be shifted from a zero point thereof due to the generated heat, thereby indicating an improper angle of vertical inclination of the reflector.

On the other hand, Unexamined Japanese Patent Publication (OPI) No. Hei. 3-91604 shown in FIG. 6 discloses an approach to minimize the influence of the heat from the bulb 4 toward the bubble in the bubble tube in a manner that the level vial 6 is disposed on the rear side of the reflector 3 in a separated fashion. This approach succeeds in reducing the influence of the heat on the bubble of the bubble tube to some extent, however, its thermal isolation capability is still insufficient. The influence of the heat may be further reduced by further separating the level vial 6 from the rear side of the reflector 3. This approach creates another problem of increasing the size of the lamp body, however.

SUMMARY OF THE INVENTION

The present invention has been made to solve the above problems accompanying the conventional arts, and an object of the invention is to provide a motor vehicle headlamp with a level vial, which is little influenced by heat generated by a light source, without increasing the size of the lamp body.

The above and other objects can be achieved by a provision of a headlamp for a motor vehicle which, according to the present invention, includes a lamp body and a front lens both defining a lamp chamber, a reflector housed within the lamp chamber and supported to be tiltable with respect to the lamp body, and a linear bubble tube type level vial for detecting a vertical inclination of the reflector is disposed substantially horizontally in the direction of the motor vehicle. The level vial extends rearward from the rear wall of the reflector, and the lamp body forms thereon a rear expanded portion for enclosing the level vial. The rear expanded portion of the lamp body forms therein an air hole allowing air to flow to and from the lamp chamber.

The level vial is disposed extended rearward from the reflector, so that the heat transfer path ranging from the light source, i.e., a heat source, to the bubble tube is elongated. Accordingly, the heat generated by the light source is sufficiently impeded when it is transferred to the bubble tube.

Further, since the rear expanded portion enclosing the level vial extending rearward from the reflector is additionally formed to the lamp body, an enlargement of the whole lamp body can be avoided.

Furthermore, air flows to and from the lamp chamber through the air hole, which is formed in the rear expanded portion according to the present invention. With provision of the air hole, a negligible amount of heat stays around the level vial within the rear expanded portion enclosing the level vial.

DESCRIPTION OF THE PREFERRED EMBODIMENTS

Figure 1:
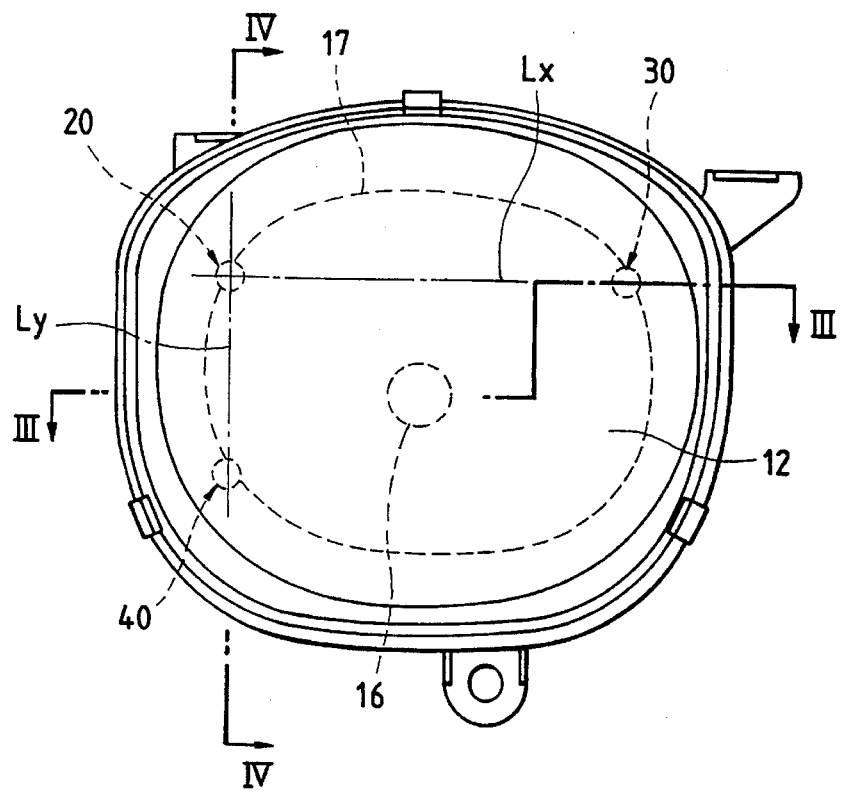
FIG. 1 is a front view showing a headlamp for a motor vehicle according to an embodiment of the present invention.
Figure 2:
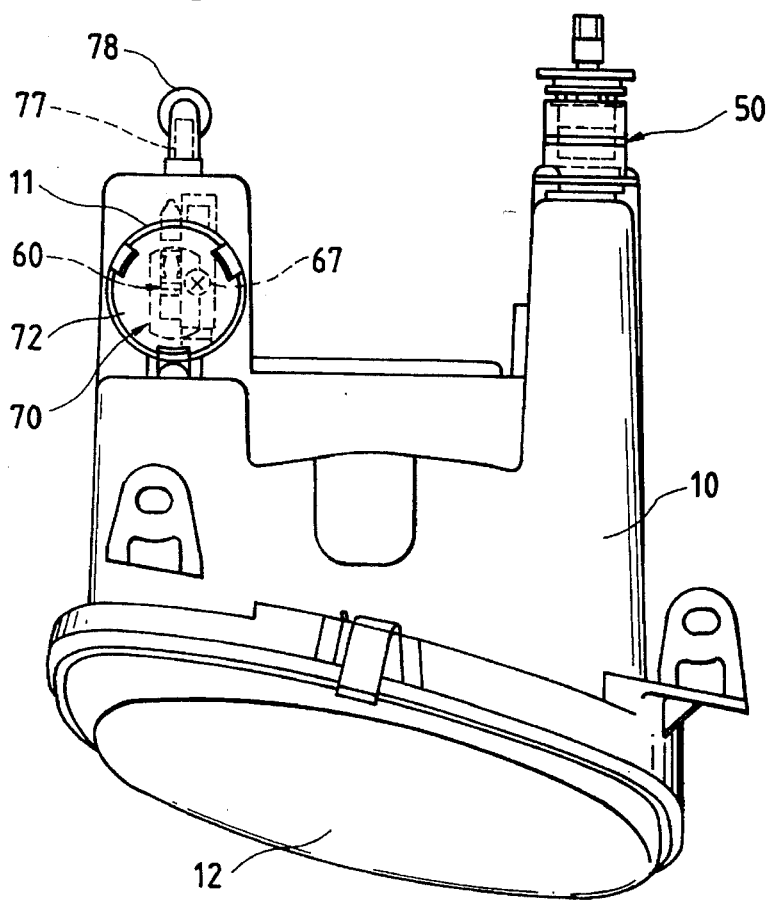
FIG. 2 is a plan view showing the headlamp.
Figure 3:
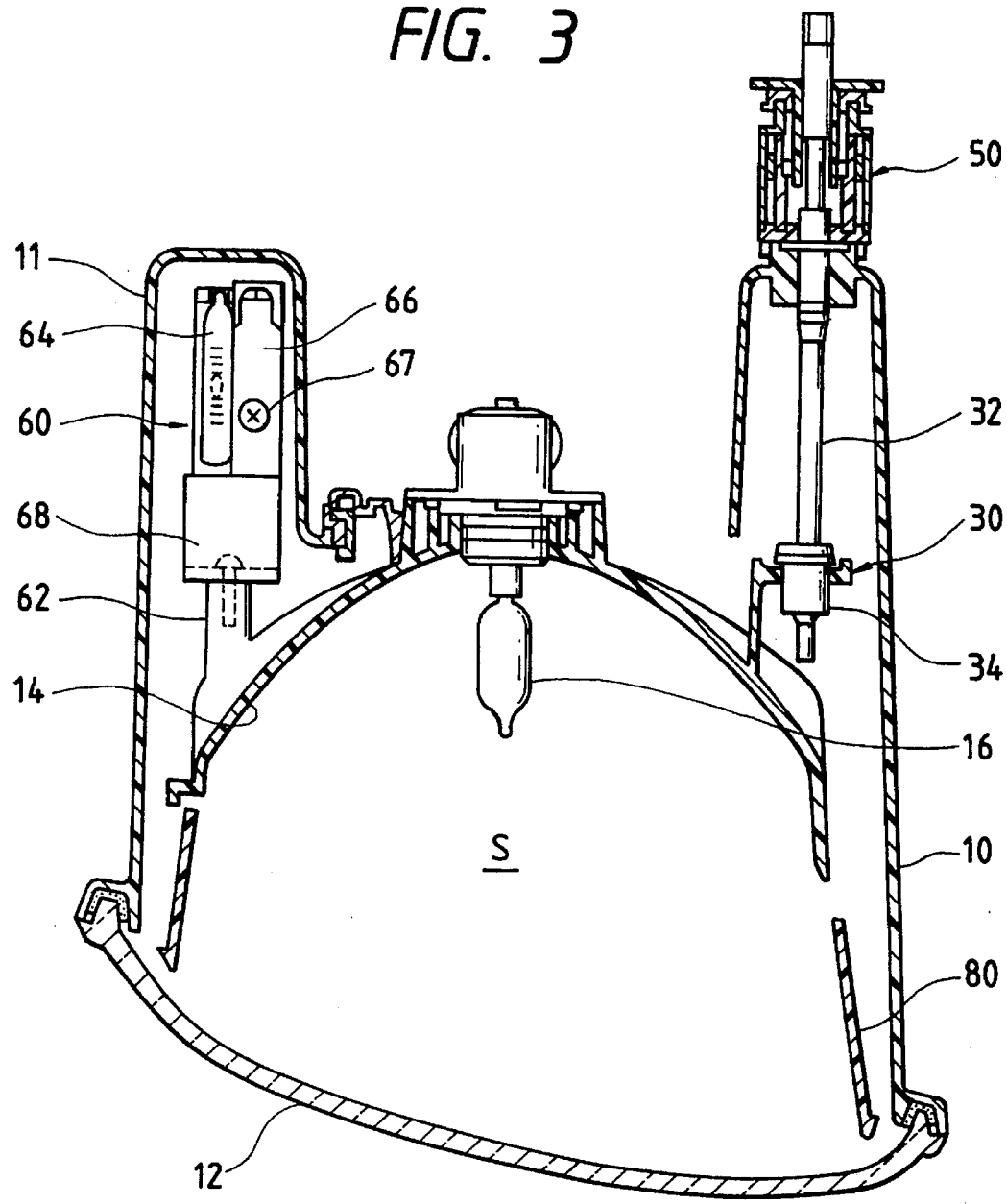
FIG. 3 is a horizontal sectional view (cross sectional view taken on line III—III in FIG. 1) showing the headlamp.
Figure 4:
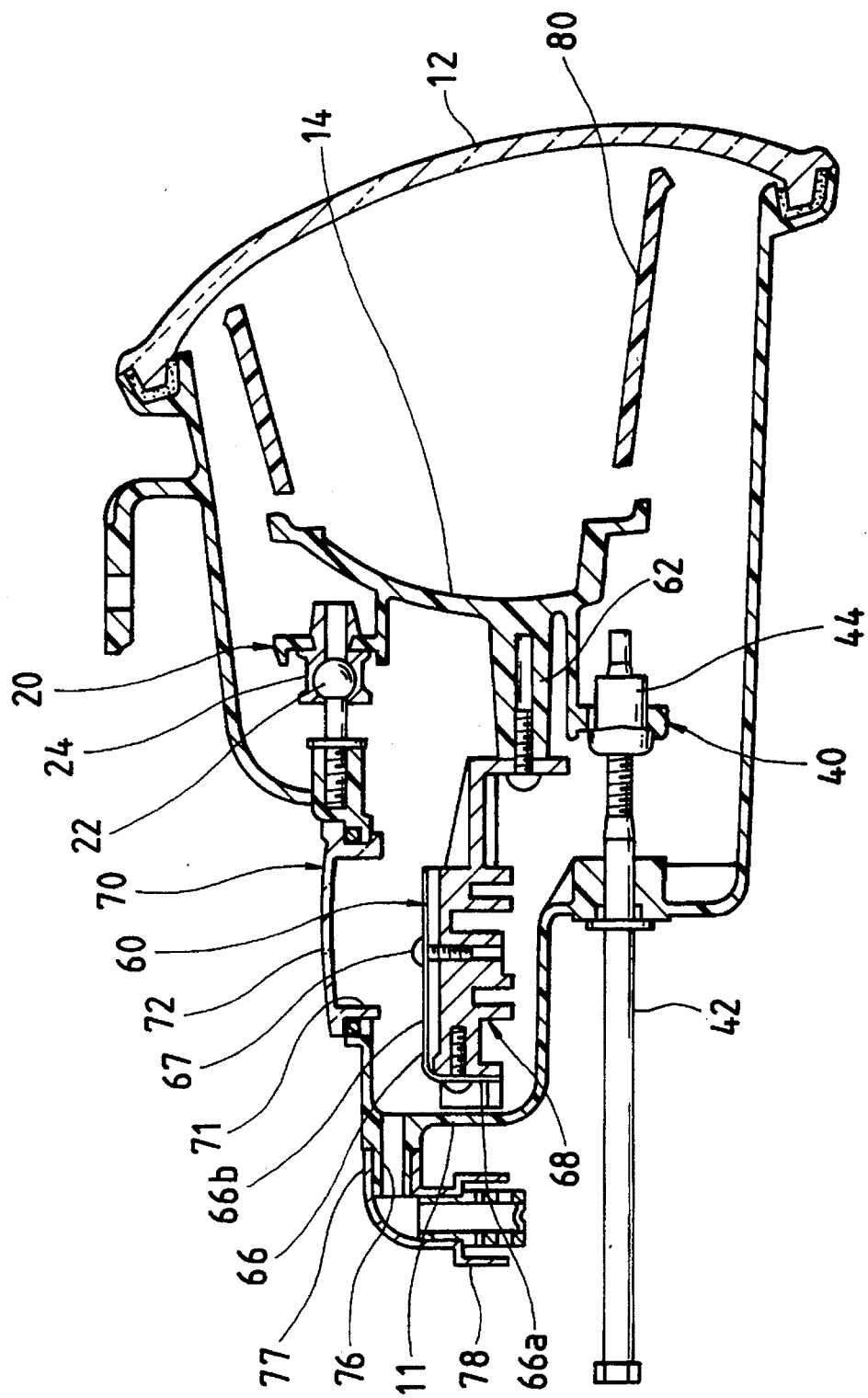
FIG. 4 is a longitudinal sectional view (cross sectional view taken on line IV—IV shown in FIG. 1) of the headlamp.
Figure 5:
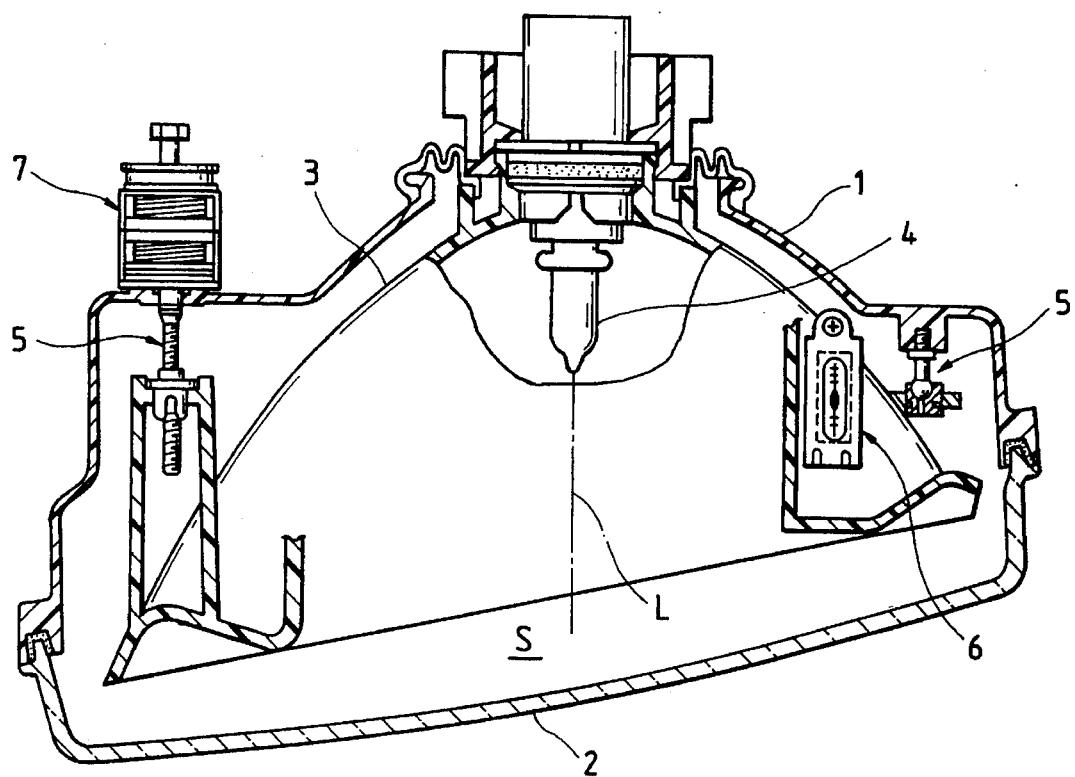
FIG. 5 is a horizontal sectional view showing a conventional headlamp for a motor vehicle.
Figure 6:
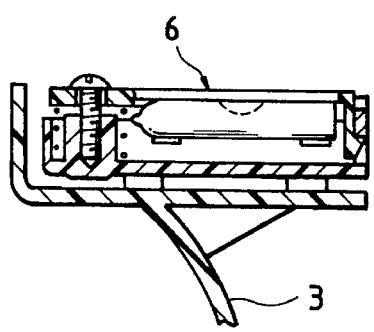
FIG. 6 is a horizontal sectional view showing another conventional headlamp for a motor vehicle.

The preferred embodiment of the present invention will be described with reference to the accompanying drawings. FIGS. 1 to 4 showing an embodiment of the present invention. Of these figures, FIG. 1 is a front view showing a headlamp for a motor vehicle according to an embodiment of the present invention, FIG. 2 is a plan view showing the headlamp, FIG. 3 is a horizontal sectional view (cross sectional view taken on line III—III in FIG. 1) showing the headlamp, and FIG. 4 is a longitudinal sectional view (cross sectional view taken on line IV—IV shown in FIG. 1) of the headlamp.

In these figures, reference numeral 10 indicates a capsule shaped lamp body. A front lens 12 is attached to the front opening of the lamp body 10, thereby forming a lamp chamber S. Within the lamp chamber S, a reflector 14 with a bulb 16 inserted thereinto is supported by an aiming mechanism so as to be tiltable with respect to the lamp body 10. The reflector 14, as shown in FIG. 1, is supported at three points, a pivot 20 located at the rectangular vertex of a rectangular triangle when viewed from the front, and a horizontal aiming point 30 and a vertical aiming point 40 located at the remaining vertices of the rectangular triangle. The fulcrum 20 has a ball-and-socket structure in which a spherical part 22 protruded from the lamp body 10 is supported by a socket 24 of the reflector 14, and is fixed for the lamp body 10. The aiming points 30 and 40 has such a structure that nuts 34 and 44 of the reflector 14 are screwed to aiming screws 32 and 42 (a horizontal aiming screw 32 and a vertical aiming screw 42), rotatably supported by the lamp body 10. When the aiming screws 32 and 42 are turned, the nuts 34 and 44 are moved along the aiming screws 32 and 42 to change the distance of the aiming points 30 and 40 from the front lens 12. By the rotation of the horizontal aiming screw 32, the reflector 14 is tilted about the vertical axis Ly, so that the horizontal inclination of the reflector 14, or the horizontal illumination angle of the headlamp can be adjusted. By the rotating operation of the vertical aiming screw 42, the reflector 14 is tilted about a horizontal axis Lx, so that the vertical inclination of the reflector 14, or the vertical illumination angle of the headlamp can be adjusted. Thus, the aiming mechanism is constructed with the fulcrum 20 of the ball-and-socket structure and the aiming screws 32 and 42. By the rotating operation of the two aiming screws 32 and 42, the horizontal and vertical inclinations of the reflector 14, viz., the illumination angle of the headlamp can be adjusted.

Reference numeral 50 designates a first level detector for detecting a horizontal inclination of the reflector 14. The reflector is located between a lamp body rearward extended portion of the horizontal aiming screw 32 and the rear wall of the lamp body. The details of the first level detector is described in detail in Unexamined Japanese Patent Publication (OPI) No. Hei. 4-198830, and hence no further description thereof will be given here.

Reference numeral 60 represents a level vial as a second level detector for detecting a vertical inclination of the reflector 14. The second level detector is provided extending rearward from the rear wall of the reflector 14. A cylindrical boss 62 like a circular pole protruding rearward from the rear surface of the reflector 14. The front part of the second level detector 60 is fastened to the protruded end of the boss 62 by means of a screw, thereby coupling the reflector 14 with the second level detector 60 in a unitary fashion. Thus, in the present embodiment, the front end of the second level detector 60 is fastened to the boss 62 protruded rearward from the rear wall of the reflector 14, thereby elongating a heat transfer path ranging from the bulb 16 as a light source to the level vial 60. In the headlamp thus constructed, the level vial 60 is little influenced by the heat generated by the bulb 16.

The level vial 60 is constructed such that a linear bubble tube 64, a tube support frame 66, like a plate spring, for supporting the linear bubble tube 64, and a base 68 for supporting the tube support frame 66 are assembled into a single unit. The tube support frame 66 is constructed such that a rear bent portion 66a is fastened to the base 68 by means of a screw, and a horizontal extended portion 66b is upwardly urged by a vertical screw 67 planted in the base 68. Through the turn of the vertical screw 67, an inclination of the linear bubble tube 64, viz., the zero-point of the linear bubble tube 64 (level vial 60), is adjusted.

Reference numeral 11 stands for a rear expanded portion of the lamp body formed so as to enclose the level vial 60 extended rearward from the reflector 14. A sight window 70 is provided just above the level vial 60 in the rear expanded portion 11. The peep window 70 is constructed such that an opening 71 is formed in the rear expanded portion 11, and a transparent cap 72 is attached to the opening 71. Through the peep window 70, a worker reads a bubble position of the linear bubble tube 64. For the zero-adjustment, he removes the transparent cap 72, inserts a screwdriver through the opening 71, and turns the vertical screw 67.

Reference numeral 76 is representative of an air hole provided at the rear portion of the rear expanded portion 11 of the lamp body. Through the air hole 76, air flows to and from the lamp chamber, thereby forming a natural convection within the lamp chamber S. With the, convection, no dew condensation is formed on the front lens 12. A dust- and water-proof cap 78, shaped like L, is mounted on a tubular rear protrusion portion 77 forming the air hole 76. Particularly in this embodiment, the air hole 76 through which air flows to and from the lamp chamber is provided at the rear end of the rear expanded portion 11 enclosing the level vial 60. Because of this, air flow around the level vial 60 is active. Accordingly, little heat stays within the rear expanded portion 11, so that the influence of heat by the bulb 16 on the linear bubble tube 64 (such a problem that the bubble position is shifted by the heat) is correspondingly lessened.

Reference numeral 80 designates an extension disposed in front of the reflector 14 so as to enclose the reflector 14. The surface of the extension 80 is coated to have a metal color, like the reflecting surface of the reflector 14. With the surface coating, the lamp chamber looks bright even when the lamp is not lit, thereby providing a good appearance of the lamp.

As seen from the foregoing description, in the headlamp for a motor vehicle according to the present invention, the level vial is disposed extended rearward from the reflector, so that the heat transfer path ranging from the light source as a heat source to the bubble tube is elongated. Accordingly, the heat generated by the light source is impeded when it is transferred to the bubble tube. Further, air flows to and from the lamp chamber through the air hole of the rear expanded portion of the lamp body. With provision of the air hole, a negligible amount of heat stays within the rear expanded portion. Consequently, the level vial properly operates under little influence by the heat from the light source.

The invention does not employ means to increase the size of the whole lamp body in connection with the level vial extended rearward from the reflector, but forms additionally the rear expanded portion enclosing the level vial to the lamp body. With this unique structure, the increase of the size of the lamp body, i.e., the headlamp, is not so much.

What is claimed is:

1. A headlamp for a motor vehicle comprising:

a main body having a front opening and a rear expanded portion;

a front lens attached to said front opening of said main body for defining a lamp chamber;

a reflector structure housed within said lamp chamber and supported to be tiltable with respect to said body, said reflector structure comprising a wall with a front-facing reflective surface and a rear facing surface; and a bubble tube type level device enclosed by said rear expanded portion for detecting a vertical inclination of said reflector, said level device being affixed on said reflector structure and being disposed substantially horizontally in a longitudinal direction of the motor vehicle, said level device extending rearward from said rear facing surface of said reflector, wherein said rear expanded portion of said lamp body forms therein an air hole allowing air to flow to and from the lamp chamber.

2. The headlamp of claim 1, wherein said rear expanded portion comprises a sight window disposed just above said level device.

3. The headlamp of claim 1, further comprising an L-shaped dust- and water-proof cap mounted on a rear protrusion portion of said rear expanded portion.

4. A headlamp for a motor vehicle comprising:

a main body having a front opening;

a front lens attached to said front opening of said main body for defining a lamp chamber;

a reflector structure housed within said lamp chamber and supported to be tiltable with respect to said body, said reflector structure comprising a wall with a front-facing reflective surface and a rear facing surface; and a bubble tube type level device for detecting a vertical inclination of said reflector, said level device being affixed on said reflector structure and being disposed substantially horizontally in a longitudinal direction of the motor vehicle, said level device extending rearward from said rear facing surface of said reflector, wherein said level device comprises a boss protruding rearward from said reflector, a base secured to said boss, and a support frame connecting to said base for holding said level device.

5. The headlamp of claim 4, wherein said base, said boss and said support frame are unitarily assembled.

6. The headlamp of claim 4, wherein said support frame is formed by a plate-like spring.

7. A headlamp for a motor vehicle comprising:

a main body having a front opening and a rear expanded portion;

a front lens attached to said front opening of said main body for defining a lamp chamber;

a reflector structure housed within said lamp chamber and supported to be tiltable with respect to said body said reflector structure comprising a wall with a front-facing reflective surface and a rear facing surface; and a bubble tube type level device enclosed by said rear expanded portion for detecting a vertical inclination of said reflector, said level device being affixed on said reflector structure and being disposed substantially horizontally in a longitudinal direction of the motor vehicle, said level device extending rearward from said rear facing surface of said reflector, wherein said rear expanded portion of said lamp body comprises an air hole.

8. The headlamp of claim 7, wherein said air hole is formed in a rear portion of said rear expanded portion.

9. A headlamp for a motor vehicle comprising:

a main body having a front opening;

a front lens attached to said front opening of said main body for defining a lamp chamber;

a reflector housed within said lamp chamber and supported to be tiltable with respect to said body; and means for detecting a vertical inclination angle of said reflector, said detection means being disposed on said reflector and extending rearward from a rear wall of said reflector, said detection means comprises a linear bubble tube positioned by a certain distance from said reflector, wherein said level device comprises a boss protruding rearward from said reflector, a base secured to said boss, and a support frame connecting to said base for holding said level device.

10. The headlamp of claim 9, wherein said base, said boss and said support frame are unitarily assembled.

11. The headlamp of claim 9, wherein said support frame is formed by a plate-like spring.

* * * * *